(12) United States Patent
Langgartner

(10) Patent No.: US 6,877,820 B2
(45) Date of Patent: Apr. 12, 2005

(54) CAST WHEEL RIM

(75) Inventor: Johann Langgartner, Gilgenberg (AT)

(73) Assignee: Austria Alu-Guss-Gesellschaft m.b.H., Braunau-Ranshofen (AT)

( * ) Notice: Subject to any disclaimer, the term of this patent is extended or adjusted under 35 U.S.C. 154(b) by 0 days.

(21) Appl. No.: 10/311,478

(22) PCT Filed: Sep. 17, 2001

(86) PCT No.: PCT/AT01/00294
§ 371 (c)(1),
(2), (4) Date: Dec. 16, 2002

(87) PCT Pub. No.: WO02/28669
PCT Pub. Date: Apr. 11, 2002

(65) Prior Publication Data
US 2003/0141755 A1 Jul. 31, 2003

(30) Foreign Application Priority Data
Oct. 6, 2000 (AT) .................... GM745/2000

(51) Int. Cl.[7] .................... B60B 1/06; B60B 3/10
(52) U.S. Cl. .................... 301/65; 301/66; 301/64.102
(58) Field of Search .................... 301/62, 63.107, 301/63.101, 64.101, 64.102, 64.704–64.705, 65–66, 95.102, 4, 95.107, 9, 95.104, 95.109; 29/894, 894.3, DIG. 5–6, 894.32; 501/6, 9, 69

(56) References Cited
U.S. PATENT DOCUMENTS 3,253,962 A * 5/1966 Watanabe et al. ............ 301/65
5,538,329 A * 7/1996 Stach .................... 301/65
5,575,539 A * 11/1996 Stach .................... 301/65
5,902,665 A * 5/1999 Kuroda .................... 501/69
5,994,246 A * 11/1999 Denry .................... 501/6
6,106,075 A * 8/2000 Suenaga .................... 301/66
6,325,462 B1 * 12/2001 Hummel et al. ............ 301/65
6,530,624 B1 * 3/2003 Stach .................... 301/65
6,758,533 B1 * 7/2004 Hummel et al. ........ 301/64.101

FOREIGN PATENT DOCUMENTS

| DE | 29723749 U1 | 2/1999 |
| DE | 19826848 A1 | 12/1999 |
| WO | WO 99/33674 | 7/1999 |
| WO | WO 99/39923 | 8/1999 |
| WO | WO 01/66283 A1 | 9/2001 |
| WO | WO 02/28669 A1 | 4/2002 |

OTHER PUBLICATIONS

Materials Science in Engineering, Carl Keyser, 1980, Charles E. Merrell Publishing company, 3rd Edition, pp. 284–296.*

* cited by examiner

Primary Examiner—Russell D. Stormer
Assistant Examiner—Jason R. Bellinger
(74) Attorney, Agent, or Firm—Pillsbury Winthrop LLP

(57) ABSTRACT

A cast wheel rim including a light-metal body which at least partially encompasses at least one shaped part forming a cast-in core and having a mean specific weight smaller than that of the light metal used for the body, wherein the shaped part is comprised of a pressed body made of a porous silicate material.

7 Claims, 2 Drawing Sheets

CAST WHEEL RIM

BACKGROUND OF THE INVENTION

1. Field of the Invention

The invention relates to a cast wheel rim including a light-metal body which at least partially encompasses at least one shaped part forming a cast-in core and having a mean specific weight smaller than that of the light metal used for the casting.

2. Description of the Related Art

In order to reduce the dead weight of cast wheel rims, on the one hand, and to continue to safeguard a high strength of the wheel rim, on the other hand, attempts have been made for quite some time to provide in wheel rims hollow cores or lost cores having as low a specific dead weight as possible.

From DE 206 973 A, a wheel rim made of aluminum is known, in which various parts of the wheel are comprised of a hollow, resistant metal such as, e.g., steel or the like, forming hollow cores and being cast round by a light aluminum alloy.

It was likewise proposed (cf. e.g. DE 41 38 558 A) to produce wheel rims with hollow spokes which are produced by the aid of sand cores in the mold tool, said sand cores being removed from the rim after production.

Furthermore, a cast wheel rim is known from U.S. Pat. No. 3,253,862 A, which is produced by casting aluminum around a lost core comprised of metal wool.

WO 99/39923 A, moreover, describes a cast wheel rim in which a cast-in core is provided to reduce the dead weight of the cast wheel rim, said core having a lower specific weight than the light metal used for the casting and to this end being, in particular, a core part comprised of aluminum foam. The manufacture of such cast wheel rims involves problems, because the core cannot be preheated to the casting temperature and is heated as the light metal is being cast round, which causes gas present within said aluminum foam to expand, whereby strength-reducing gas inclusions are likely to occur in the light-metal wheel rim body. Preheating of the core part to the temperature of the liquid light metal—as would be desirable in order to avoid the expansion of enclosed air during the casting procedure—is not feasible since the aluminum-foam core part would loose its dimensional stability.

SUMMARY OF THE INVENTION

It is, therefore, the object of the invention to provide a cast wheel rim having a low dead weight which does not entail said manufacturing engineering problems regarding the loss of dimensional stability or the expanding gas of the shaped part, and to provide a cast wheel rim that is easy to produce and offers a high strength.

The cast wheel rim of the initially defined kind is characterized in that the shaped part is comprised of a pressed body made of a porous silicate material.

By the aid of a shaped part made of a porous silicate material, a cast-in core exhibiting a high temperature resistance is provided in the cast wheel rim, which can, thus, be preheated to at least substantially the casting temperature and will, therefore, remain dimensionally stable during preheating; after preheating, no gas explosion will consequently take place as the light metal used for the casting is being cast round. Furthermore, no penetration of molten light metal into the openings of the porous material will occur on account of the structure of the silicate material.

In order to be able to reliably ensure that the air enclosed in the shaped part does not expand as the latter is being cast round, which would bring about strength-reducing gas inclusions in the light-metal body and hence a high reject rate during manufacture, it is advantageous if the silicate material has a temperature resistance up to a temperature that is higher than the melting point of the light metal used for the casting. The shaped part can, thus, be readily preheated to the temperature suitable for casting round, while retaining its dimensional stability required for handling; yet, no further heating of the shaped part during casting and, of course, also no expansion of the gas enclosed in the porous shaped part during heating will occur.

Since, above all, aluminum is used in the manufacture of cast wheel rims, which is cast substantially at a temperature of 700° C., it is beneficial if the silicate material has a temperature resistance up to at least 1000° C. The shaped part, while maintaining its shape required for the manufacture of the cast wheel rim, can thus be preheated to a temperature higher than the casting temperature of the light metal. As a result, air enclosed in the porous silicate material will not expand further during casting and gas inclusions in the light-metal body will not occur.

In order to provide a cost-effective shaped part that is easy to produce in terms of manufacturing engineering and constitutes a cast-in core, it is advantageous if the silicate material is comprised of Al, Mg and/or Fe silicates. A material especially satisfying all requirements as to temperature resistance, light-metal infiltration avoidance and cost efficiency is used for the shaped part if the silicate material is comprised of silicate-bonded aluminum-iron-magnesium silicate. In order to attain a wheel rim dead weight reduced in view of cast wheel rims having cast-in metal foam cores, it is advantageous if the specific density of the mineral/ceramic material is smaller than 0.7 $g/cm^3$ and, preferably, substantially 0.4 $g/cm^3$.

Preferably, a material based on vermiculite, an Al—Fe—Mg silicate from the group of mica minerals, is used, which is rapidly heated to expel crystal water, whereby the individual laminar layers of the crystal structure are drifted apart and the originally solid, flat crystals expand into long, worm-like particles. The thus obtained granular material is then mixed with a waterglass-type binder, pressed into a shaped body and dried, whereupon it can be employed as a shaped part around which light metal is cast for the production of a cast wheel rim.

Furthermore, the provision of such a porous silicate shaped part offers the advantage that, on account of the structure of the silicate material, an infiltration will not take place by itself and thus need not be prevented by the formation of a cast-resistant, closed external skin on a metallically porous shaped part. Hence, the process control in the manufacture of cast wheel rims by means of light-metal bodies and cast-in light cores is substantially facilitated.

BRIEF DESCRIPTION OF THE DRAWINGS

In the following, the invention will be explained in even more detail by way of particularly preferred exemplary embodiments illustrated in the drawing, to which it is, however, not limited. Therein.

DETAILED DESCRIPTION

Figure 1:
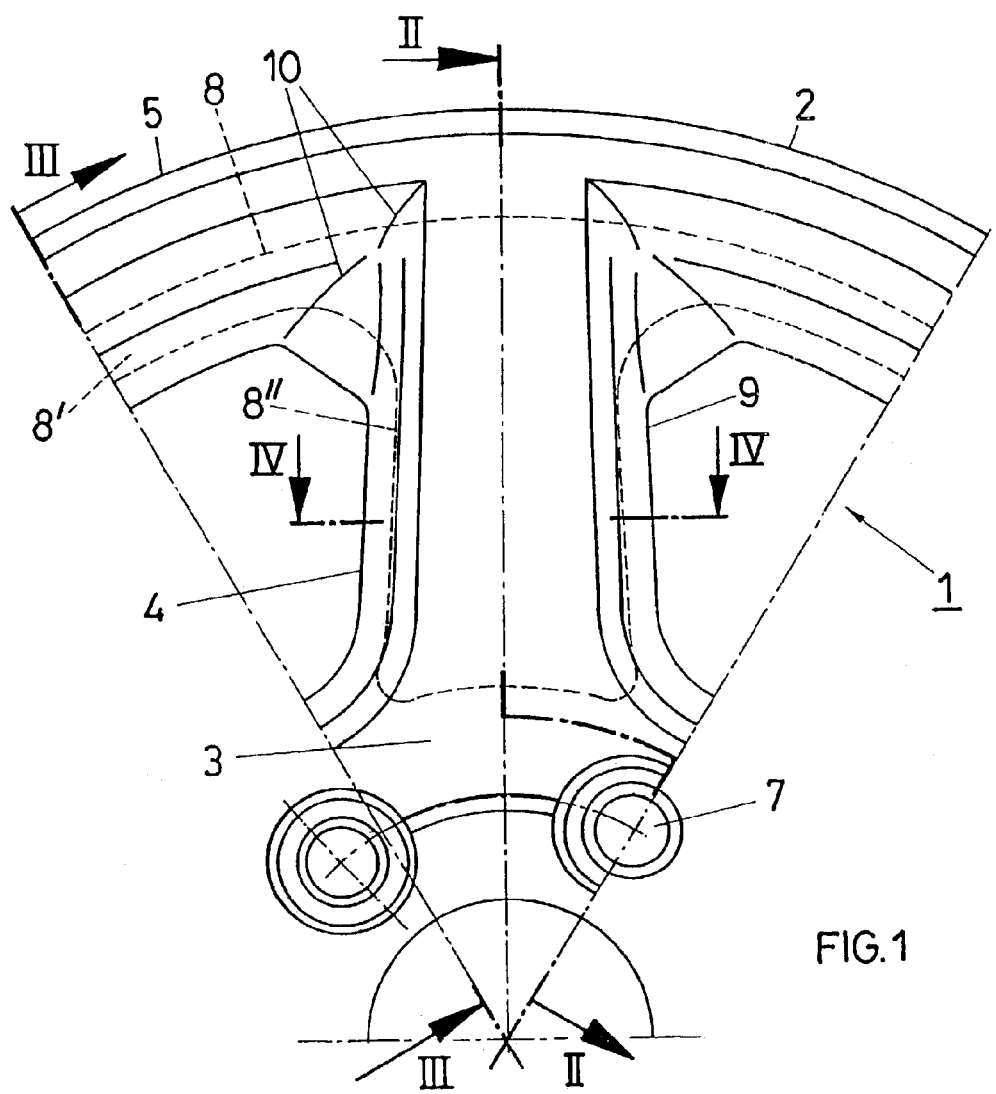
FIG. 1 shows a sector-shaped section of a cast wheel rim.

The cast wheel rim 1 illustrated in the drawing and at present considered as particularly preferred (in the following briefly referred to as wheel rim) is comprised of a wheel body 2 configured as a composite body and including a hub portion 3, a rib portion 4 and a bead portion 5 with a wheel rim base 6. In the hub portion 3, bolt bores 7 are conventionally provided to screw-fasten the wheel rim 1 together with the tire mounted thereon, which is not illustrated in detail.

The wheel rim body 2 is cast of light metal in a conventional manner; the present wheel rim is, for instance, a wheel rim cast of aluminum or magnesium. As is the case with conventional light-metal wheel rims, the light metal for the present wheel rim 1 is substantially cast in the form of closed "hollow" sections similar to box sections, whereby high strength values can be attained. In order to keep the manufacture as simple as possible, the "hollow" spaces in these box sections or, generally, in the closed sections of the wheel rim 1 are filled out by light-weight shaped parts prefabricated of porous silicate material in the form of pressed bodies, and subsequently inserted into the casting tool (not illustrated) during the casting of the wheel rims 1.

By the aid of these shaped parts, the production process is substantially facilitated as against shaped parts made of metals or metal foam, since the former offer a temperature resistance exceeding the casting temperature of usual light metals like aluminum and aluminum-magnesium alloys. The shaped part, prior to casting, can thus be preheated to a temperature exceeding the casting temperature while maintaining its shape. This is of great advantage, because the air enclosed in the shaped part of a low specific mass will not be subjected to an expansion during casting, which might result in strength-reducing gas inclusions in the light-metal body surrounding the shaped parts.

In the present exemplary embodiment, a one-piece shaped part 8, i.e. a pressed body, made of porous silicate material is provided, which is circularly closed in the bead portion at 8' and constructed in one piece with radially inwardly projecting spoke shaped parts 81, in the rib portion 4, in the region of the rim spokes 9.

Figure 2:
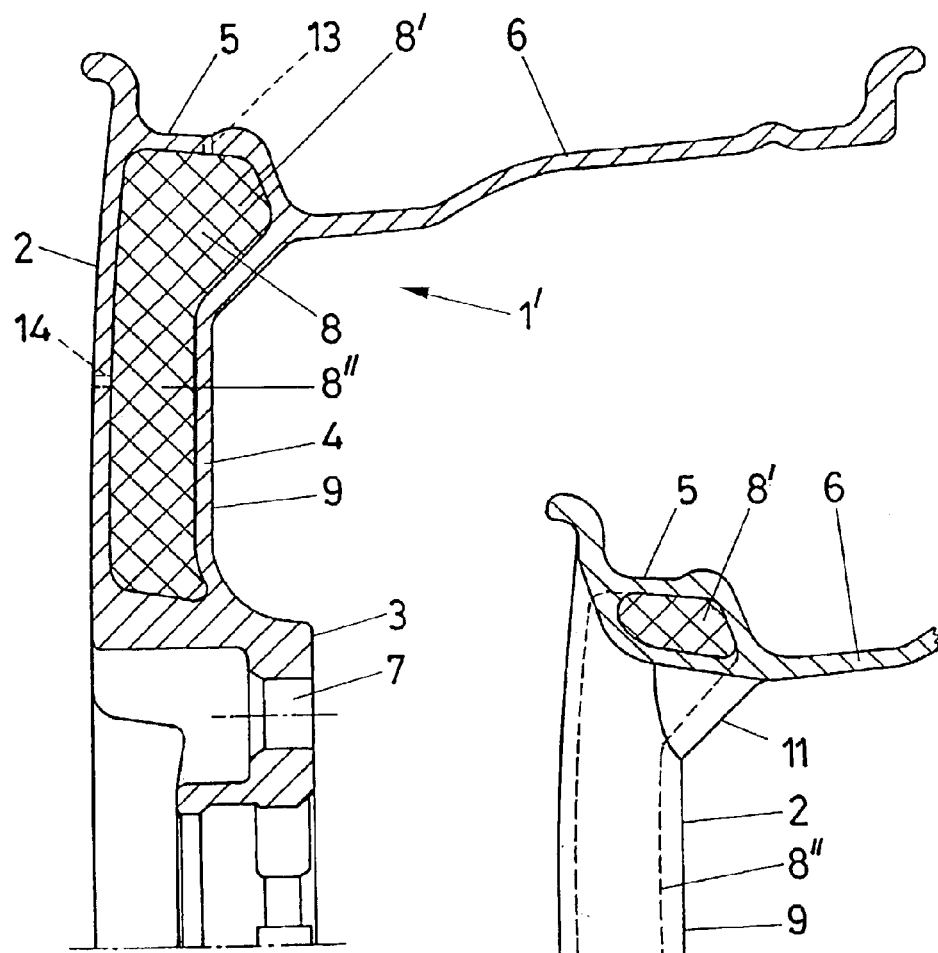
FIG. 2 shows a radial section through this cast wheel rim along line II—II of FIG. 1, in the region of a spoke of the cast wheel rim.
Figure 3:
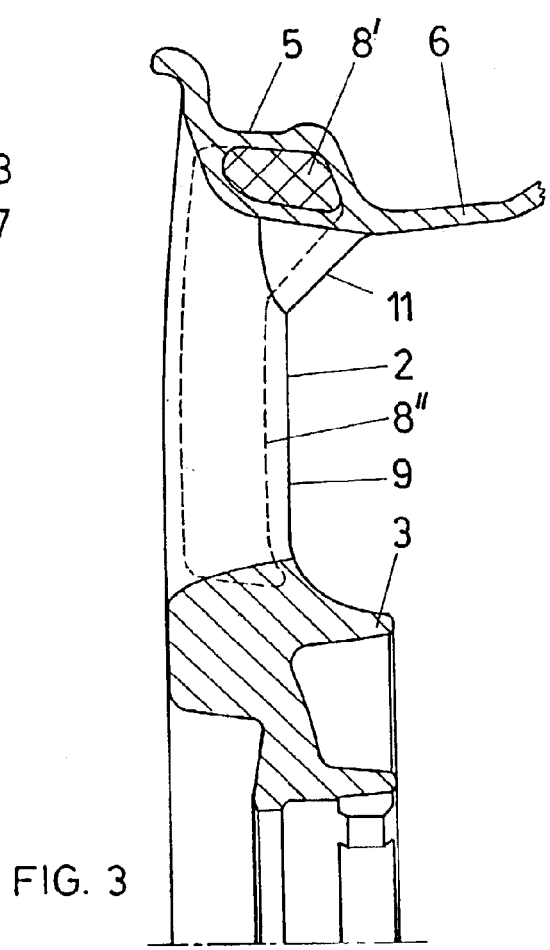
FIG. 3 shows a section angularly offset relative to the former section, along line III—III of FIG. 1 to elucidate the cross section of the cast wheel rim in the region of a passage provided between the spokes of the cast wheel rim.

As is apparent from the drawing and, in particular, from FIG. 3 as compared with FIG. 2, the shaped part 8, i.e., the circularly closed external part 8', in its portion between the spokes 9 is designed to be smaller in cross section than the portion immediately radially beyond the spokes 9, wherein the associated bead portion 5 of the wheel rim 1 in those circumferential sections also has a smaller cross section which, via transitional portions 10 and 11, respectively, joins the larger-thickness sections of in the region of the spokes 9.

Figure 4:
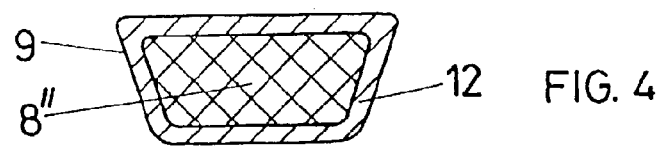
FIG. 4 shows a cross section in the region of a spoke of said cast wheel rim along line IV—IV of FIG. 1.

Depending on the shape of the wheel rim—the wheel rim 1 illustrated with its spokes 9 is to be regarded as but one of a number of examples—the shaped parts 8 may, of course, also have different designs and it is, in particular, also possible to provide the shaped parts 8" in the region of the spokes as parts separated from the annular shaped part 8'. It is also conceivable to provide several shaped parts adjacently in a spaced-apart relationship in the rib portion 4 within the spokes 9, so that multi-compartment hollow sections will be formed by the light metal during casting. What is important, anyway, is that by casting light metal around the light-weight pressed-body shaped parts 8 and 8', 8", respectively, closed box sections are formed as indicated at 12 in FIG. 4, whereby high strength values and a substantially facilitated production as compared to metal shaped parts will be obtained.

In doing so, very thin-walled box sections 12 can be provided in a simple manner by the shaped parts 8 and 8', 8", respectively—no special measures having to be taken for eventually expanding gas—without affecting their strength. Moreover, the porous pressed-body shaped parts 8 or 8', 8", respectively, have very low mean specific weights as compared to the light metal used for the wheel rim 1 proper and even in comparison with metal-foam shaped parts, so that additional weight advantages are obtained.

In experiments silicate-bonded aluminum-iron-magnesium silicate such as, e.g., vermiculite, has proved to be particularly advantageous for the manufacture of shaped parts 8 and 8', 8", respectively, yet an accordingly simplified manufacture as regards the casting into light metal is also reached with comparable, similar porous silicate materials of different types.

It is, therefore, feasible to economically produce in the regions concerned such as, in particular, in the region of the spokes 9 and in the bead portion 5, cross sections which, by providing porous core parts, enable at a low specific weight by an extremely simple manufacture a maximum degree of strength at a minimum of light-metal mass (and hence a minimum weight). Depending on the gas portion, the silicate materials may have specific weights of, for instance, 0.4 to 0.5 $kg/dm^3$ with good results in practical tests having been obtained with silicate materials having a specific weight of around 0.45 $kg/dm^3$. For a simple and cost-effective production of the shaped parts 8; 8', 8", the latter are simply produced by a pressing process; the material need neither be sintered nor baked.

During production, comparatively simple shaping procedures may be envisaged for the wheel rim 1, wherein, in particular, no bends or the like are required in the regions concerned, as were provided in the past in order to increase the strength of the profiled sections; accordingly, also the casting tools for the wheel rims 1 can be designed in a relatively simple manner.

Prior to the casting of light metal, e.g. cast aluminum, the prefabricated and preheated shaped parts 8 and 8', 8", respectively, are inserted into the casting tool and there are fixed in their right positions by the aid of centering pins 13, 14. In view of a high temperature resistance, the centering pins 13, 14 can be made of a ceramic material.

After this, the light metal is cast into the casting tool with the shaped parts 8 and 8', 8" being cast round. The centering pins 13, 14, two of which are schematically indicated in FIG. 2, remain in the light metal of the wheel rim 1, and possible parts protruding from the outer side of the wheel rim 1 are simply ground off after removal from the mold.

It goes without saying that the porous shaped parts 8, 8', 8" are to be chosen such that they do not melt as they are cast around by the light metal. The previously mentioned silicate materials, i.e. preferably Al, Mg and Fe silicates, are well suited for this purpose in that no adverse penetration of light metal will occur on account of their ceramic structures. With porous metallic materials, however, the infiltration of light metal into the metal body would be prevented only by an oxidic skin usually formed during production and having a higher melting temperature than the light metal of the wheel rim body 2. If this were not the case, an overpressure would have to be applied at porous metallic materials in order to prevent their infiltration through the light metal.

The present wheel rim 1 is particularly suitable for passenger car wheels and truck wheels and for motorcycles as well as for wheels used in aircraft construction.

What is claimed is:

1. A cast wheel rim including a light-metal wheel body which at least partially encompasses at least one shaped part forming a cast-in core and having a mean specific weight smaller than that of the light metal used for the wheel body, wherein the shaped part is comprised of a pressed body made of a porous silicate material having openings, the porous silicate material having a structure such that infiltration of the light metal into the openings of porous silicate material is prevented, and said cast-in core is permanently retained within the wheel body during use.

2. A cast wheel rim according to claim 1, wherein the silicate material of said pressed body has a temperature resistance up to a temperature that is higher than the melting point of the light metal used for the wheel body.

3. A cast wheel rim according to claim 2, wherein the silicate material of the pressed body has a temperature resistance up to at least 1000° C.

4. A cast wheel rim according to claim 1, wherein the silicate material is comprised of at least one Al—, Mg— and Fe-silicates.

5. A cast wheel rim according to claim 4, wherein the silicate material is comprised of silicate-bonded aluminum-iron-magnesium silicate.

6. A cast wheel rim according to claim 1, wherein the specific density of the silicate material is smaller than 0.7 g/cm$^3$.

7. A cast wheel rim according to claim 1, wherein the specific density of the silicate material is smaller than 0.4 g/cm$^3$.

* * * * *

UNITED STATES PATENT AND TRADEMARK OFFICE
CERTIFICATE OF CORRECTION

PATENT NO. : 6,877,820 B2
APPLICATION NO. : 10/311478
DATED : April 12, 2005
INVENTOR(S) : Langgartner et al.

It is certified that error appears in the above-identified patent and that said Letters Patent is hereby corrected as shown below:

On the Title Page:

(56) References Cited replace "3,253,962"
with --3,253,862--

Signed and Sealed this

Sixteenth Day of October, 2007

JON W. DUDAS
*Director of the United States Patent and Trademark Office*

UNITED STATES PATENT AND TRADEMARK OFFICE
CERTIFICATE OF CORRECTION

PATENT NO. : 6,877,820 B2
APPLICATION NO. : 10/311478
DATED : April 12, 2005
INVENTOR(S) : Johann Langgartner et al.

It is certified that error appears in the above-identified patent and that said Letters Patent is hereby corrected as shown below:

On title page, item (75): Inventor, please add --Helmuth HUBER, Maria Schmolln (AT)--.

Signed and Sealed this

Nineteenth Day of August, 2008

JON W. DUDAS
*Director of the United States Patent and Trademark Office*